United States Patent
Sakai et al.

(10) Patent No.: US 8,926,241 B2
(45) Date of Patent: Jan. 6, 2015

(54) MACHINE TOOL

(75) Inventors: Shigetsugu Sakai, Nara (JP); Toshio Ueda, Nara (JP)

(73) Assignee: DMG Mori Seiki Co., Ltd., Nara (JP)

( * ) Notice: Subject to any disclaimer, the term of this patent is extended or adjusted under 35 U.S.C. 154(b) by 1055 days.

(21) Appl. No.: 12/971,829

(22) Filed: Dec. 17, 2010

(65) Prior Publication Data

US 2011/0164939 A1     Jul. 7, 2011

(30) Foreign Application Priority Data

Jan. 4, 2010  (JP) .................................. 2010-000054

(51) Int. Cl.
*B23Q 1/01*     (2006.01)
*B23Q 11/00*    (2006.01)

(52) U.S. Cl.
CPC .............. *B23Q 1/017* (2013.01); *B23Q 11/001* (2013.01)
USPC .......................................... 409/235; 409/237

(58) Field of Classification Search
CPC .. B23Q 1/017; B23Q 11/001; B23Q 2701/01; B23Q 2701/02
USPC ........ 409/235, 237, 238, 239; 384/10, 40, 54, 384/57
See application file for complete search history.

(56) References Cited

U.S. PATENT DOCUMENTS

| | | | | |
|---|---|---|---|---|
| 2,869,933 | A * | 1/1959 | Bissinger | 384/13 |
| 6,883,789 | B2 * | 4/2005 | Kimura | 267/137 |
| 7,140,775 | B2 * | 11/2006 | Saito | 384/13 |

FOREIGN PATENT DOCUMENTS

| | | |
|---|---|---|
| JP | S52-144490 | 11/1977 |
| JP | 2002-239859 | 8/2002 |
| JP | 4190738 B2 | 12/2008 |
| WO | 2007099632 A1 | 9/2007 |

OTHER PUBLICATIONS

EPO Machine Translation of WO2007099632A1—Kitaura et al., "Machine Tool Main Spindle Balancer," Sep. 7, 2007.*
JPO Machine Translation of JP2002239859A—Saito et al., "Semi-Floating Type Slide Guide Mechanism of Machine Tool," Sep. 7, 2002.*

(Continued)

*Primary Examiner* — Daniel Howell
*Assistant Examiner* — Michael Vitale
(74) *Attorney, Agent, or Firm* — WPAT, P.C.; Anthony King; Kay Yang (57) ABSTRACT

A machine tool 1 has a support body 11, moving bodies 12, 13, 14, 15 with an engagement member 12*a* having an engagement hole 12*b*, a guide mechanism 20 for guiding the movement of the moving bodies 12, 13, 14, 15, a guide rail 31 provided along the moving direction of the moving bodies 12, 13, 14, 15 on the support body 11, a moving member 32 having a moving member body 33 engaged with the guide rail 31 and an engagement shaft 34 provided on the moving member body 33 and engaged with the engagement hole 12*b* and a collar member 35 provided on the tip portion of the engagement shaft 34, and a compressing spring 38 in which the engagement shaft 34 is inserted and which energizes the engagement member 12*a*. The engagement member 12*a* is provided on the opposite side to the moving body 14.

8 Claims, 4 Drawing Sheets

(56) References Cited

OTHER PUBLICATIONS

Office action issued on Nov. 1, 2013 to the corresponding Japan Application No. 2010-000054.

English translation for Office action issued on Nov. 1, 2013 to the corresponding Japan Application No. 2010-000054.

English Abstract of JP S52-144490 cited by an Office Action issued on Aug. 6, 2014 by JIPO for the corresponding JP Patent Application No. 2010-000054.

Office Action issued on Aug. 6, 2014 by JIPO for the corresponding JP Patent Application No. 2010-000054.

* cited by examiner

MACHINE TOOL

TECHNICAL FIELD

The present invention relates to a machine tool having a support body, a moving body disposed on the support body to be movable in a predetermined direction, guide means for guiding the movement of the moving body, and feed means for moving the moving body.

BACKGROUND ART

Figure 7:
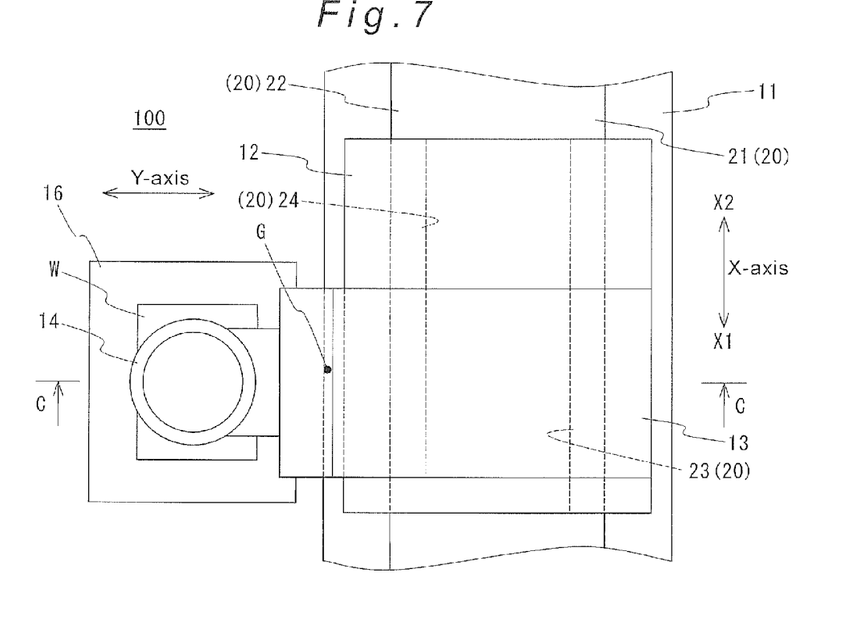
FIG. 7 is a plane view showing a schematic configuration of a machine tool according to an example of a conventional one.
Figure 8:
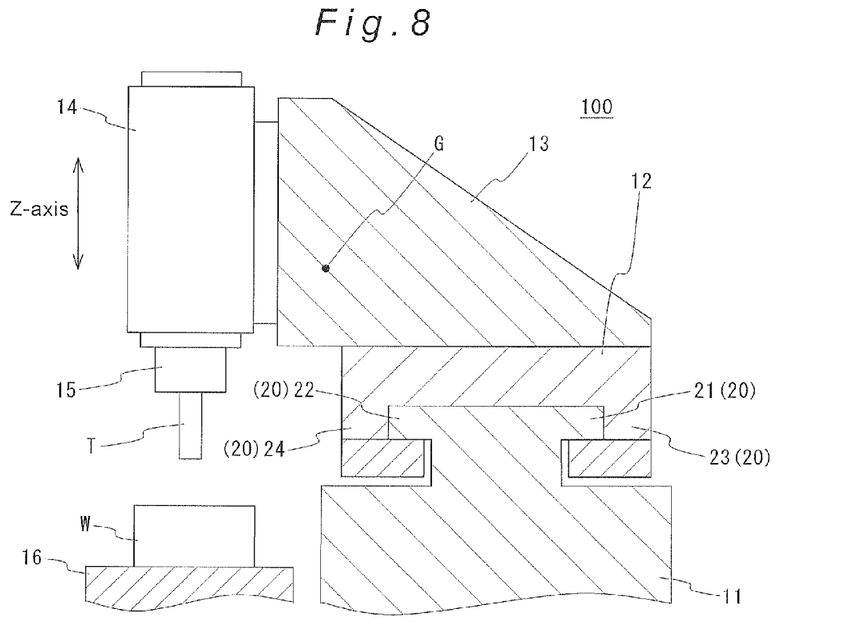
FIG. 8 is a sectional view taken along the arrow C-C in FIG. 7.

As the machine tool as described above, for example, a machine tool 100 as shown in FIGS. 7 and 8 has been known. The machine tool 100 has a bed 11, a slide 12 disposed on the top of the bed 11 and provided to be movable in an X-axis direction being a horizontal direction (the lower side of the figure sheet is indicated by X1 and the upper side of the figure sheet is indicated by X2), a support member 13 fixedly provided on an X1-side portion of the top of the slide 12, a spindle head 14 supported on the front face of the support member 13 and provided to be movable in a Z-axis direction being the vertical direction, a spindle 15 which is supported by the spindle head 14 to be rotatable its axis with its axis parallel to the Z axis and to a lower end portion of which a tool T is mounted, and a table 16 which is disposed on the top of the bed 11 and provided to be movable in a Y-axis direction perpendicular to both of the X and Z axes and on the top of which a workpiece W is placed.

Further, the machine tool 100 has, in addition to an X-axis guide mechanism 20 for guiding the movement of the slide 12 in the X-axis direction, although not shown in the figures, a Z-axis guide mechanism for guiding the movement of the spindle head 14 in the Z-axis direction, a Y-axis guide mechanism for guiding the movement of the table 16 in the Y-axis direction, an X-axis feed mechanism for moving the slide 12 in the X-axis direction, a Z-axis feed mechanism for moving the spindle head 14 in the Z-axis direction, a Y-axis feed mechanism for moving the table 16 in the Y-axis direction and the a rotation drive mechanism for rotating the spindle 15 about its axis.

The X-axis guide mechanism 20 is configured with two bed-side sliding guide portions 21, 22 (first bed-side sliding guide portion 21 and second bed-side sliding guide portion 22) formed along the X-axis direction on the upper face of the bed 11 with a distance in the Y-axis direction therebetween and two slide-side sliding guide portions 23, 24 (first slide-side sliding guide portion 23 and second slide-side sliding guide portion 24) formed along the X-axis direction on the lower face of the slide 12 with a distance in the Y-axis direction therebetween, and guides the movement of the slide 12 by means of an engagement relationship between the sliding guide portions 21, 22, 23, 24. The slide-side sliding guide portions 23, 24 are formed to hold the bed-side sliding guide portions 21, 22, respectively.

By the way, in the machine tool 100 thus configured, the position of the center of gravity G of a moving structure which is configured with the slide 12, the support member 13, the spindle head 14, the spindle 15 and the tool T is located at such a position as shown in the figures and an offset load acts on the sliding guide portions 21, 22, 23, 24, that is, a larger load acts on an X1-side portion of the second slide-side sliding guide portion 24 than on other portions and the loads acting on the sliding guide portions 21, 22, 23, 24 are not uniform.

For this reason, there are caused a problem that sliding resistance which acts between the X1-side portion of the second slide-side sliding guide portion 24 and the second bed-side sliding guide portion 22 when moving the moving structure (slide 12) in the X-axis direction is so large that the moving structure cannot be moved smoothly, and a problem that uneven wear occurs on the X1-side portion of the second slide-side sliding guide portion 24 and the second bed-side sliding guide portion 22. In addition, there is also a problem that, when a region where sliding resistance is large due to the offset load is distant from the point of force application (drive point) where force is applied to the moving structure by the X-axis feed mechanism, a force causing the moving structure to rotate about the region where sliding resistance is large is generated and accuracy of positioning of the moving structure is thereby reduced.

Therefore, conventionally, a guide mechanism disclosed in the Japanese Patent No. 4190738 has been suggested, for example. This guide mechanism is for guiding the movement of a column which is disposed on a bed to be movable in the forward and backward direction being a horizontal direction and which has its center of gravity on its front side, and it has a bed-side sliding guideway formed along the moving direction of the column (the forward and backward direction) on the upper surface of the bed, a column-side sliding guideway formed along the moving direction of the column on the lower surface of the column and engaged with the bed-side sliding guideway, holing portions for holding lubricating oil formed in the column-side sliding guideway at the column-front-face side and at the column-rear-face side and a lubricating oil supply portion for supplying lubricating oil to the holding portions.

Two said bed-side sliding guideways and two said column-side sliding guideways are formed and both the bed-side sliding guideways and the column-side sliding guideways are spaced in a horizontal direction perpendicular to the moving direction of the column. Each of the holding portions is configured with a land portion and an oil groove, and the holding portion formed at the column-front-face side is formed to have a larger area than the holding portion formed at the column-rear-face side. Further, the lubricating oil supply portion supplies lubricating oil to the holding portion formed at the column-front-face side at a greater flow rate than to the holding portion formed at the column-rear-face side.

In the guide mechanism thus configured, since the holding portion at the column-front-face side is formed to have a larger area than that of the holding portion at the column-rear-face side and lubricating oil is supplied to the holding portion at the column-front-face side at a greater flow rate than to the holding portion at the column-rear-face side, a force supporting the column by means of an oil film of the lubricating oil is greater at the column-front-face side than at the column-rear-face side. Thereby an offset load is prevented from acting on the sliding guideways even when the column having its center of gravity on its front side is moved.

SUMMARY OF INVENTION

Technical Problem

However, in the above-described conventional guide mechanism, although it is possible to make the forces supporting the column by means of an oil film of lubricating oil at the column-front-face side and at the column-rear-face side different from each other, the forces supporting the column on two column-side sliding guideways are the same and the forces supporting the column by means of an oil film of lubricating oil on the column-side sliding guideways cannot be changed separately.

Therefore, even if the above-described conventional guide mechanism is applied to the machine tool 100 shown in FIGS. 7 and 8, it is not possible to completely prevent an offset load from acting on the sliding guide portions 21, 22, 23, 24. That is, in the machine tool 100, since a larger load acts on an X1-side portion of the second slide-side sliding guide portion 24 than on other portions, a supporting force by means of an oil film of lubricating oil at this portion needs to be increased. However, with the above-described conventional guide mechanism, it is not possible to increase the supporting force only at the X1-side portion of the second slide-side sliding guide portion 24 and the supporting force is increased at both of the X1-side portions of the slide-side sliding guide portions 23, 24, and therefore it is not possible to completely suppress the offset load acting on the sliding guide portions 21, 22, 23, 24.

Further, in the above-described conventional guide mechanism, piping for supplying lubricating oil is necessary, and thereby there are a problem that the structure is complicated and a problem that it is necessary to keep supply of lubricating oil throughout the operation of the machine tool 100. Furthermore, because a gap for an oil film of lubricating oil formed is set between the first bed-side sliding guide portion 21 and the first slide-side sliding guide portion 23 and between the second bed-side sliding guide portion 22 and the second slide-side sliding guide portion 24, there is also a problem that lubricating oil is likely to leak from the gaps and thereby the consumption of lubricating oil and the frequency of maintenance are increased.

The present invention has been achieved in view of the above-described circumstances, and an object thereof is to provide a machine tool capable of suppressing an offset load which acts on a guide portion with a simple configuration.

Solution to Problem

The present invention, for achieving the above-described object, relates to a machine tool comprising:
a support body;
a moving body disposed on the support body to be movable in a predetermined direction;
guide means having a support-body-side guide portion provided on the support body so that its guide direction is along the moving direction of the moving body and a moving-body-side guide portion provided on the moving body and engaged with the support-body-side guide portion, and guiding the movement of the moving body with the engagement relationship between the guide portions, the guide means having at least two said support-body-side guide portions and at least two said moving-body-side guide portions provided, both the support body-side guide portions and moving-body-side guide portions being spaced in a direction perpendicular to the moving direction of the moving body; and
feed means for moving the moving body,
the machine tool further comprising:
a guide member provided on the support body so that its guide direction is parallel to the moving direction of the moving body;
a moving member engaged with the guide member and to be guided thereby, the moving member having a moving-member-side engagement portion engaged with a moving-body-side engagement portion which is provided on the moving body, and moving together with the moving body due to the engagement relationship between the moving-body-side engagement portion and the moving-member-side engagement portion; and
energizing means provided on the moving member for energizing the moving body in such a direction that an offset load which acts on the guide means due to the relationship between the positions where the moving-body-side guide portions are arranged and the position of the center of gravity of the moving body is eliminated.

According to this invention, the moving body is energized by the energizing means in such a direction that an offset load which acts on the guide means due to the relationship between the positions where the moving-body-side guide portions are arranged and the position of the center of gravity of the moving body is eliminated. Thereby, any offset load acting on the guide means can be eliminated and thereby resistance which acts between the guide portions when the moving body is moved can be made uniform. As a result, it is possible to move the moving body smoothly, to prevent uneven wear of the guide portions, and to increase accuracy of positioning of the moving body. As such energizing means, for example, energizing means for which a spring, pneumatic pressure, hydraulic pressure etc. are used can be given, but the energizing means is not limited thereto.

Further, when the moving body is driven by the feed means and is guided by the guide means and thereby moved in the predetermined direction, the moving member is guided by the guide member and thereby moved together with the moving body in the same direction as the moving direction of the moving body due to the engagement relationship between the moving-body-side engagement portion and the moving-member-side engagement portion. Therefore, even when the moving body is moved, the portion of the moving body which is energized by the energizing means is not changed. Therefore, even when the moving body is moved, the energization portion of the moving body where it is energized by the energizing means is not changed and the energizing means can always apply energization to the same portion of the moving body. In addition, even if the support-body-side guide portions and the moving-body-side guide portions are not strictly parallel to the guide direction of the guide member, the misalignment between them can be absorbed by the energizing means.

Furthermore, in this invention, unlike the above-described conventional guide mechanism, the offset load acting on the guide means is not suppressed by actively supplying lubricating oil. Therefore, for piping for supplying lubricating oil, it is sufficient that, when the guide portions are configured from sliding guide portions, only piping for supplying lubricating oil which is used for lubricating the sliding guide portions is provided. Further, because lubricating oil hardly leaks from the guide portions, the consumption of lubricating oil and the frequency of maintenance are not increased.

A configuration may be employed in which: the moving body has an engagement member with an engagement hole, which is the moving-body-side engagement portion, provided in the vicinity of a position symmetrical to the position of the center of gravity of the moving body with respect to a virtual center point of the moving-body-side guide portions in the moving plane of the moving body; the moving member is configured with a moving member body engaged with the guide member and to be guided thereby, an engagement shaft provided on the moving member body in a standing position with the outer peripheral surface between the tip portion and the root portion thereof being in engagement with the engagement hole, which is the moving-member-side engagement portion, and a collar member provided on the tip portion of the engagement shaft; and the energizing means is configured with a compressing spring in which the engagement shaft is inserted and which energizes the engagement member with its end portions being respectively in contact with the engagement member and the collar member.

Alternatively, a configuration may be employed in which: the moving body has an engagement member with an engagement hole, which is the moving-body-side engagement portion, provided in the vicinity of the position of the center of gravity of the moving body; the moving member is configured with a moving member body engaged with the guide member and to be guided thereby and an engagement shaft, which is the moving-member-side engagement portion, provided on the moving member body in a standing position with the outer peripheral surface of its tip portion being in engagement with the engagement hole; and the energizing means is configured with a compressing spring in which the engagement shaft is inserted and which energizes the engagement member with its end portions being respectively in contact with the moving member body and the engagement member.

In this case, the moving member is moved together with the moving body due to the engagement relationship between the engagement hole of the engagement member and the engagement shaft of the moving member, and the engagement member (moving body) is energized (pressed down or supported) due to the energizing force of the compressing spring. Therefore, also when being thus configured, the similar effect as the above can be obtained, and further, since the energizing means is configured with a compressing spring, it is possible to remove the offset load with a simpler configuration.

Further, a configuration may be employed in which: a screw groove is formed in the outer peripheral surface of the tip portion of the engagement shaft; and the collar member is configured with an annular plate having an annulus in which the engagement shaft is inserted and having one end surface being in contact with the compressing spring, and a nut which is screwed with the screw groove and with which the other end surface of the annular plate is in contact. Alternatively, a configuration may be employed in which: a screw groove is formed in the outer peripheral surface of the engagement shaft; the moving member further has an annular plate having an annulus in which the engagement shaft is inserted and a nut which is screwed with the screw groove and which is provided closer to the root of the engagement shaft than the annular plate and with which one end surface of the annular plate is in contact; and the compressing spring energizes the engagement member with its end portions being respectively in contact with the other end surface of the annular plate and the engagement member.

Such a configuration is preferable since the energizing force of the compressing spring can be adjusted by adjusting the position of the nut in the direction along the axis of the engagement shaft.

Further, the support-body-side guide portions and the moving-body-side guide portions may be configured with sliding guide portions. In sliding guide, even when lubricating oil is not supplied actively to the holding portions unlike the above-described conventional guide mechanism, sliding portions of the guide portions are in contact with each other through an oil film of the lubricating oil which is provided in advance thereto and it is usual that a gap is formed between sliding guide portions in consideration of the film thickness of the oil film, which is not formed in the case of rolling guide portions. Therefore, the moving body is likely to be inclined due to an offset load and thereby machining accuracy tends to be reduced. Further, in the case where an offset load acts on the guide means, resistance caused when moving the moving body is larger in the case of sliding guide than in the case of rolling guide. Therefore, when the guide means is configured with the sliding guide portions, removing the offset load is more effective.

Advantageous Effects of Invention

Thus, according to the machine tool of the present invention, it is possible to effectively suppress an offset load which acts on the guide means with a simple configuration.

DESCRIPTION OF EMBODIMENTS

Figure 1:
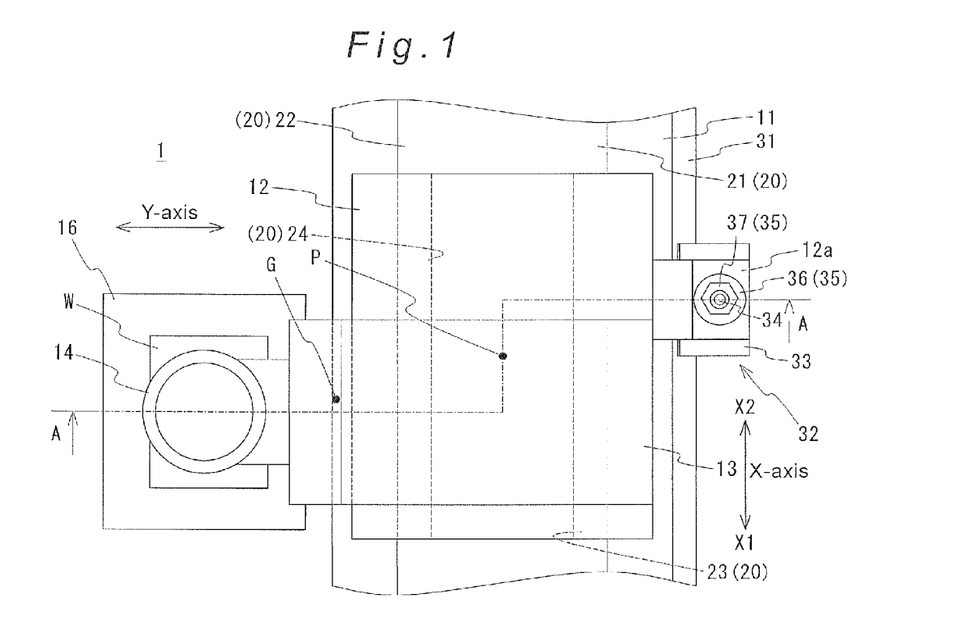
FIG. 1 is a plane view showing a schematic configuration of a machine tool according to one embodiment of the present invention.
Figure 2:
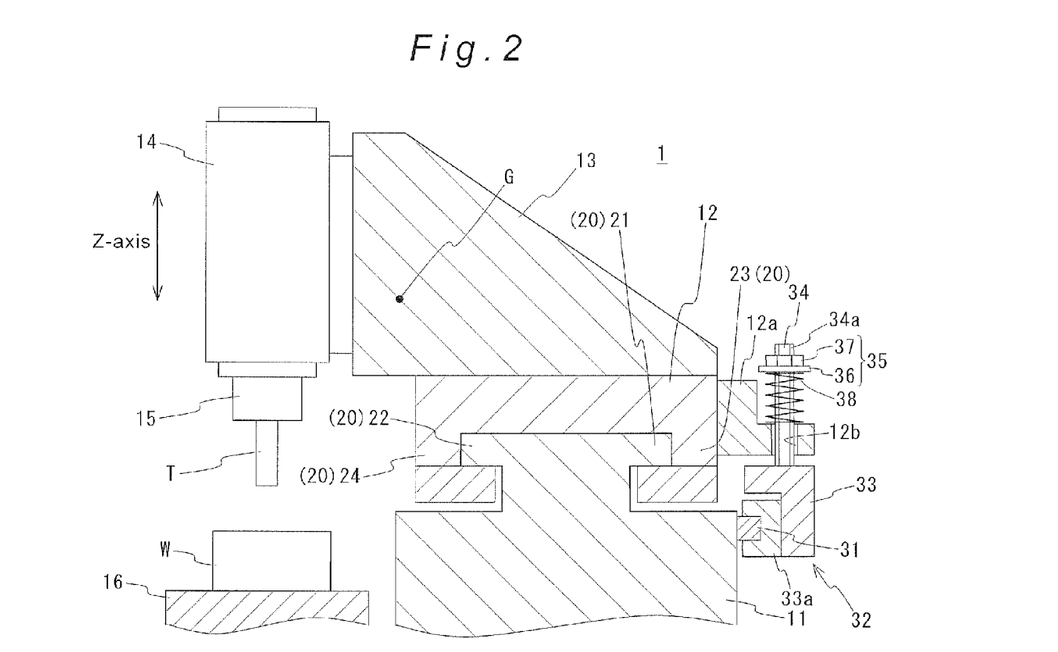
FIG. 2 is a sectional view taken along the arrow A-A in FIG. 1.

Hereinafter, a specific embodiment of the present invention will be described with reference to the accompanying drawings. FIG. 1 is a plane view showing a schematic configuration of a machine tool according to one embodiment of the present invention, and FIG. 2 is a sectional view taken along the arrow A-A in FIG. 1. A machine tool 1 of the embodiment is an improvement of a machine tool 100 shown in FIGS. 7 and 8, and only a part of its configuration is different from that of the machine tool 100. Therefore, the same components as that of the machine tool 100 are denoted by the same references, and detailed explanations thereof are omitted.

As shown in FIGS. 1 and 2, the machine tool 1 of the embodiment has, in addition to a bed 11, a slide 12, a support member 13, a spindle head 14, a spindle 15, a table 16, an X-axis guide mechanism 20, a Z-axis guide mechanism (not shown), a Y-axis guide mechanism (not shown), an X-axis feed mechanism (not shown), a Z-axis feed mechanism (not shown), a Y-axis feed mechanism (not shown) and a rotation drive mechanism (not shown), a guide rail (guide member) 31 arranged parallel to the X axis, a moving member 32 engaged with the guide rail 31 and moving therealong and a compressing spring (energizing means) 38 provided on the moving member 32 for energizing the slide 12 in such a direction that the offset load acting on the X-axis guide mechanism 20 is eliminated.

The bed 11 corresponds to a support body recited in the claims; a moving structure configured with the slide 12, support member 13, spindle head 14, spindle 15 and tool T corresponds to a moving body recited in the claims; bed-side sliding guide portions 21, 22 correspond to support-body-side sliding guide portions recited in the claims; and slide-side sliding guide portions 23, 24 correspond to moving-body-side sliding guide portions recited in the claims.

The slide 12 has an engagement member 12a fixedly provided in the vicinity of a position symmetrical to the position of the center of gravity G of the moving structure with respect to one virtual center point P which can be calculated from the positions where the slide-side sliding guide portions 23, 24 are arranged, that is, fixedly provided at a portion closer to X2 than the center position in the X-axis direction in a side face thereof which is parallel to the X-axis and is positioned on the opposite side to the side on which the spindle head 14 is arranged, and the engagement member 12a has an engagement hole 12b formed therethrough in the vertical direction.

The virtual center point P is a point where the distances from each of the slide-side sliding guide portions 23, 24 thereto are equal to each other in a moving plane of the moving structure (slide 12) (in the embodiment, the X-Y plane). Further, the position symmetrical to the position of the center of gravity G of the moving structure with respect to the virtual center point P is set in the moving plane (the X-Y plane).

The guide rail 31 is fixedly provided on a side face of the bed 11 which is parallel to the X-axis and is positioned on the opposite side to the side on which the spindle head 14 is arranged.

The moving member 32 is configured with a moving member body 33 having a slider 33a engaged with the guide rail 31 and to be guided thereby, an engagement shaft 34 provided on the top of the moving member body 33 in a standing position with its axis in the vertical direction and engaged with the engagement hole 12a at the outer peripheral surface between the tip portion and the root portion thereof, and a collar member 35 provided on the tip portion of the engagement shaft 34.

A screw groove 34a is formed in the outer peripheral surface of the engagement shaft 34, and the collar member 35 is configured with an annular plate 36 having an annulus in which the engagement shaft 34 is inserted, and a nut 37 which is screwed with the screw groove 34a at a position closer to the tip of the engagement shaft 34 than the annular plate 36 and with which one end surface of the annular plate 36 is in contact.

The compressing spring 38 is arranged between the engagement member 12a and the annular plate 36 with the engagement shaft 34 inserted therein, and energizes the engagement member 12a with its ends being respectively in contact with the engagement member 12a and the other end surface of the annular plate 36.

According to the machine tool 1 of the embodiment thus configured, the engagement member 12a which is provided in the vicinity of a position symmetrical to the position of the center of gravity G of the moving structure with respect to the virtual center point P of the slide-side sliding guide portions 23, 24 in the moving plane of the moving structure (slide 12) (in the X-Y plane) is pressed down by the compressing spring 38. Therefore, even when an offset load acts on the sliding guide portions 21, 22, 23, 24, that is, an larger load acts on an X1-side portion of the second slide-side sliding guide portion 24 than on other portions and loads which act on the sliding guide portions 21, 22, 23, 24 are not uniform, the offset load can be eliminated and thereby sliding resistance which act between the first bed-side sliding guide portion 21 and the first slide-side sliding guide portion 23 and between the second bed-side sliding guide portion 22 and the second slide-side sliding guide portion 24 can be made uniform. Thereby, with a simple configuration, it is possible to move the moving structure smoothly, to prevent uneven wear of the sliding guide portions 21, 22, 23, 24, and to increase accuracy of positioning of the moving structure.

When the slide 12 is driven by the X-axis feed mechanism (not shown) and is guided by the X-axis guide mechanism 20 and thereby moved in the X-axis direction, the moving member 32 is moved together with the slide 12 in the X-axis direction due to the engagement relationship between the engagement hole 12b of the engagement member 12a and the engagement shaft 34 of the moving member 32, and the portion of the slide 12 which is energized by the compressing spring 38 is not changed by the movement of the slide 12. Therefore, even when the slide 12 is moved, the energization portion of the slide 12 where it is energized by the compressing spring 38 is not changed and the compressing spring 38 can always apply energization to the same portion of the slide 12. Further, even if the guide rail 31 is not strictly parallel to the sliding guide portions 21, 22, 23, 24, the misalignment between them can be absorbed by the compressing spring 38.

Further, since, unlike the above-described conventional guide mechanism, this does not suppress the offset load acting on the sliding guide portions 21, 22, 23, 24 by actively supplying lubricating oil, it is sufficient to provide only piping for supplying lubricating oil which is used to lubricate the sliding guide portions 21, 22, 23, 24, and, because lubricating oil is hardly leaks from the sliding guide portions 21, 22, 23, 24, the consumption of lubricating oil and the frequency of maintenance are not increased.

Furthermore, it is possible to adjust the energizing force of the compressing spring 38 by adjusting the position of the nut 37 in the direction along the axis of the engagement shaft 34 of the moving member 32. Therefore, it is possible to adjust the energizing force depending on the degree of the offset load acting on the sliding guide portions 21, 22, 23, 24.

As described above, the X-axis guide mechanism 20 is configured with the sliding guide portions 21, 22, 23, 24. In the sliding guide portions 21, 22, 23, 24, even if, unlike the above-described conventional guide mechanism, lubricating oil is not actively supplied to the holding portions, the sliding portions thereof are in contact with each other through an oil film of the lubricating oil which is supplied in advance thereto. Therefore, it is usual that a gap is formed between the sliding guide portions 21, 22, 23, 24 in consideration of the film thickness of the oil film, which is not formed in the case of rolling guide portions. Therefore, the moving structure is likely to be inclined due to an offset load and thereby machining accuracy tends to be reduced. Further, when an offset load acts on the sliding guide portions 21, 22, 23, 24, resistance caused when moving the moving structure is larger compared with in the case of rolling guide. Therefore, when the X-axis guide mechanism 20 is configured with sliding guide like the machine tool 1 of the embodiment, a greater effect can be obtained by removing the offset load.

Thus, one embodiment of the present invention has been described. However, a specific mode in which the present invention can be realized is not limited thereto.

Figure 3:
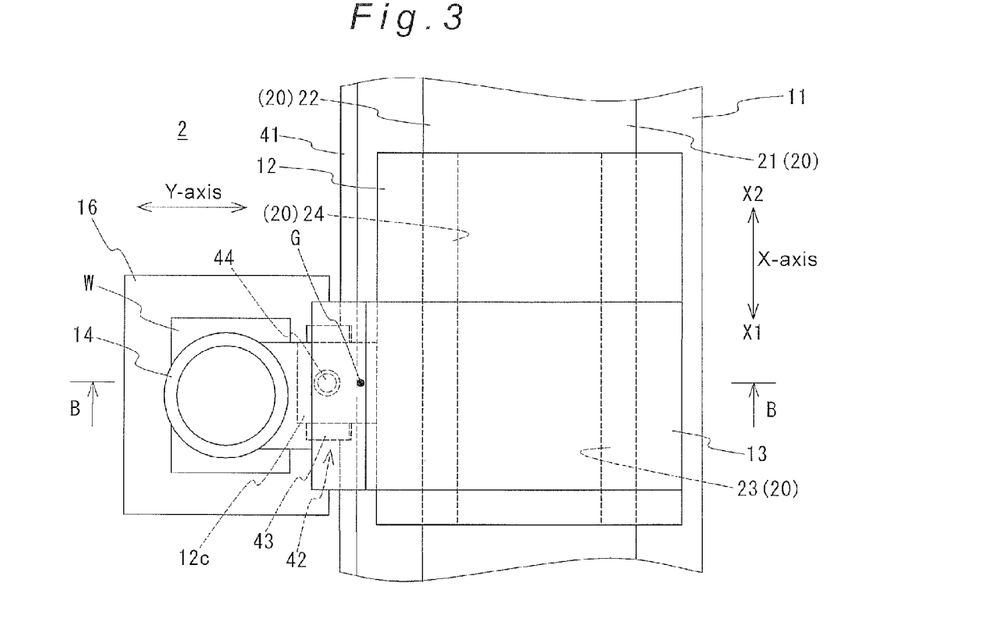
FIG. 3 is a plane view showing a schematic configuration of the machine tool according to another embodiment of the present invention.
Figure 4:
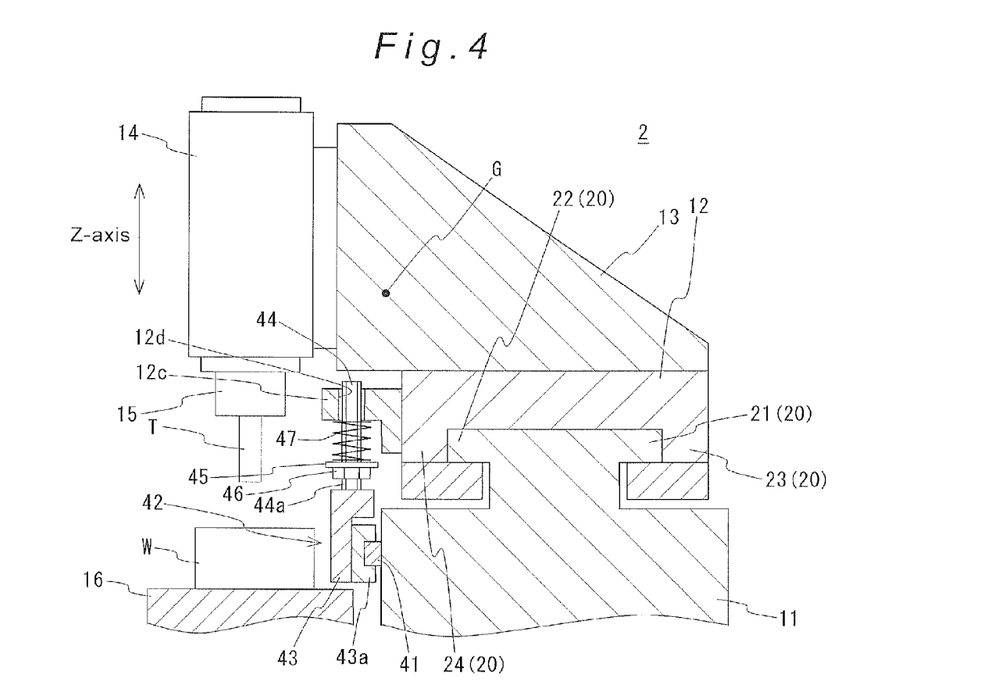
FIG. 4 is a sectional view taken along the arrow B-B in FIG. 3.

For example, although, in the above embodiment, the slide 12 is pressed down by the compressing spring 38, the slide 12 may be supported as shown in FIGS. 3 and 4. In this case, a machine tool 2 has, instead of the guide rail 31, moving member 32 and compressing spring 38, a guide rail (guide member) 41 arranged parallel to the X-axis, a moving member 42 engaged with the guide rail 41 and moving therealong, and a compressing spring (energizing means) 47 provided on the moving member 42 for energizing the slide 12 in such a direction that the offset load acting on the X-axis guide mechanism 20 is eliminated.

The slide 12 has an engagement member 12c fixedly provided in the vicinity of the position of the center of gravity G of the moving structure, that is, fixedly provided at a portion closer to X1 than the center position in the X-axis direction in the side face thereof which is parallel to the X-axis and is positioned on the side where the spindle head 14 is arranged, and the engagement member 12c has an engagement hole 12d formed therethrough in the vertical direction.

The guide rail 41 is fixedly provided on the side face of the bed 11 which is parallel to the X-axis and is positioned on the side where the spindle head 14 is arranged.

The moving member 42 is configured with a moving member body 43 having a slider 43a engaged with the guide rail 41 and to be guided thereby, an engagement shaft 44 provided on the top of the moving member body 43 in a standing position with its axis in the vertical direction, the engagement shaft 44 being engaged with the engagement hole 12a at the outer peripheral surface of the tip portion thereof and having a screw groove 44a formed in the outer peripheral surface thereof, an annular plate 45 having an annulus in which the engagement shaft 44 is inserted and being arranged closer to the root of the engagement shaft 44 than the engagement member 12c, and a nut 46 which is screwed with the screw groove 44a and which is provided closer to the root of the engagement shaft 44 than the annular plate 45 and with which one end surface of the annular plate 45 is in contact.

The compressing spring 47 is arranged between the engagement member 12c and the annular plate 45 with the engagement shaft 44 inserted therein, and energizes the engagement member 12c with its ends being respectively in contact with the engagement member 12c and the other end surface of the annular plate 45.

Also in the machine tool 2 thus configured, since the engagement member 12c provided in the vicinity of the position of the center of gravity G of the moving structure is supported by the compressing spring 47, it is, similarly to the above, possible to eliminate the offset load acting on the sliding guide portions 21, 22, 23, 24. Further, when the slide 12 is moved in the X-axis direction, the moving member 42 is moved together with the slide 12 in the X-axis direction due to the engagement relationship between the engagement hole 12d of the engagement member 12c and the engagement shaft 44 of the moving member 42. Therefore, similarly to the above, the compressing spring 47 can always apply energization to the same portion of the slide 12. Therefore, the similar effect as that of the machine tool 1 can be obtained.

Figure 5:
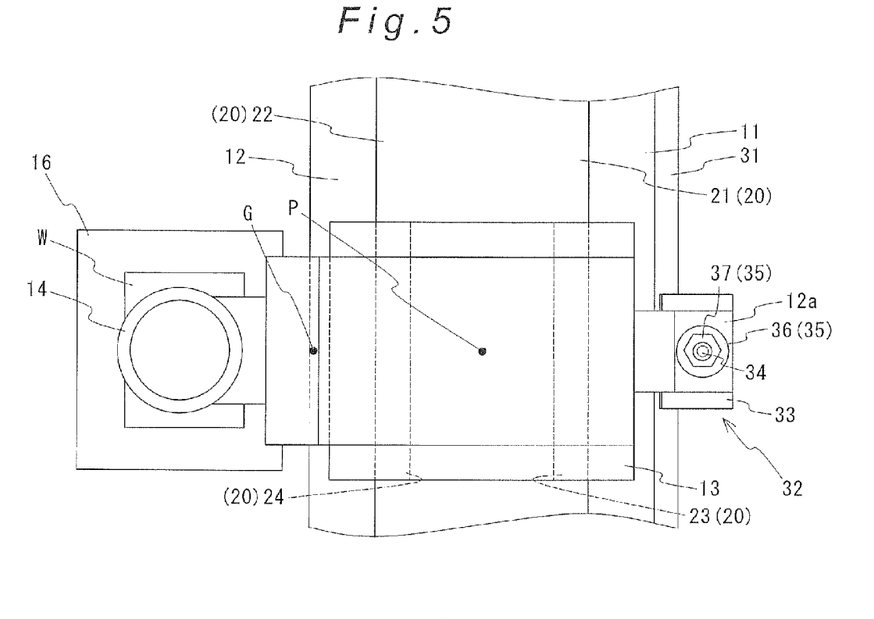
FIG. 5 is a plane view showing a schematic configuration of the machine tool according to another embodiment of the present invention.
Figure 6:
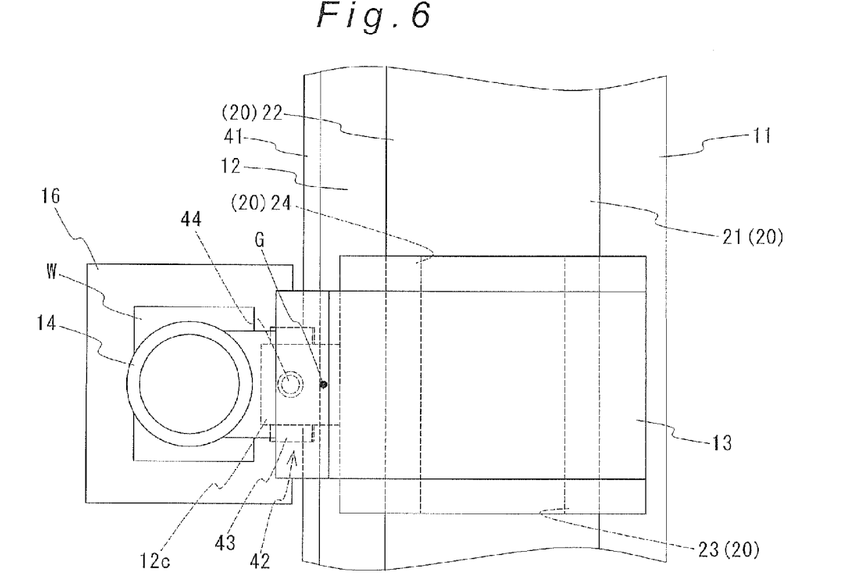
FIG. 6 is a plane view showing a schematic configuration of the machine tool according to another embodiment of the present invention.

In the machine tools 1, 2, since the support member 13 is arranged on the X1-side portion of the top of the slide 12, the engagement member 12a provided at the portion closer to X2 than the center position in the X-axis direction of the slide 12 is pressed down by the compressing spring 38 or the engagement member 12c provided at the portion closer to X1 than the center position in the X-axis direction of the slide 12 is supported by the compressing spring 47. However, as shown in FIGS. 5 and 6, in the case where the support member 13 is arranged on the central portion in the X-axis direction of the top of the slide 12, it is advantageous that the engagement member 12a provided on the central portion in the X-axis direction of the side face of the slide 12 is pressed down by the compressing spring 38 or the engagement member 12c provided on the central portion in the X-axis direction of the side face of the slide 12 is supported by the compressing spring 47.

Further, in the above embodiments, the positions of the nuts 37, 46 in the directions along the axes of the engagement shafts 34, 44 are adjustable. However, the configuration is not limited thereto, and a configuration may be employed in which a collar member 35, instead of the annular plate 36 and nut 37, is fixedly provided on the engagement shaft 34, or a configuration may be configured in which the annular plate 45 and the nut 46 are omitted and the compressing spring 47 energizes the engagement member 12c with its ends being respectively in contact with the engagement member 12c and the top surface of the moving member body 43. In this case, the screw grooves 34a, 44a of the engagement shafts 34, 44 are omitted.

Furthermore, the X-axis guide mechanism 20 is not necessarily configured with sliding guide, and it may be configured with rolling guide. Further, the moving direction of the moving structure is not limited to the above.

REFERENCE SIGNS LIST

1 Machine tool
11 Bed
12 Slide
12a Engagement member
12b Engagement hole
13 Support member
14 Spindle head
15 Spindle
20 X-axis guide mechanism
21, 22 Bed-side sliding guide portion
23, 24 Slide-side Sliding guide portion
31 Guide rail
32 Moving member
33 Moving member body
34 Engagement shaft
35 Collar member
36 Annular plate
37 Nut
38 Compressing spring
G Position of the center of gravity
P Virtual center point

CITATION LIST

Patent Literature

Japanese Patent No. 4190738

What is claimed is:
1. A machine tool comprising:
a support body;
a moving body disposed on the support body to be movable in a horizontal direction;
guide means having two support-body-side guide portions being provided on the support body so that their guide directions are along the moving direction of the moving body and two moving-body-side guide portions being provided on the moving body and engaged with the support-body-side guide portions, and guiding the movement of the moving body with the engagement relationship between the guide portions, the support-body-side guide portions being spaced in a direction perpendicular to the moving direction of the moving body, the moving-body-side guide portions being spaced in the direction perpendicular to the moving direction of the moving body;
feed means for moving the moving body; and
the moving body having a center of gravity such that, when the center of gravity is projected on a moving plane of the moving body, the position of the projected center of gravity on the moving plane is positioned in a region outside a region between the moving-body-side guide portions in the direction perpendicular to the moving direction of the moving body, the machine tool further comprising:

a guide member provided on the support body so that its guide direction is parallel to the moving direction of the moving body;

a moving member engaged with the guide member and to be guided thereby, the moving member having a moving-member-side engagement portion engaged with a moving-body-side engagement portion which is provided on the moving body, and moving together with the moving body due to the engagement relationship between the moving-body-side engagement portion and the moving-member-side engagement portion; and energizing means provided on the moving member for energizing the moving body in such a direction that an offset load which acts on the guide means due to the relationship between the positions where the moving-body-side guide portions are arranged and the position of the center of gravity of the moving body is offset, wherein:

the moving body has an engagement member with an engagement hole as the moving-body-side engagement portion provided thereon, the engagement member being positioned in a region opposite a region including the position of the projected center of gravity with the moving-body-side guide portions therebetween within the region outside the region between the moving-body-side guide portions;

the moving member is configured with a moving member body engaged with the guide member and to be guided thereby, an engagement shaft as the moving-member-side engagement portion provided on the moving member body in a standing position with the outer peripheral surface between the tip portion and the root portion thereof being in engagement with the engagement hole, and collar member provided on the tip portion of the engagement shaft; and the energizing means is configured with a compressing spring in which the engagement shaft is inserted and energizes the engagement member with its ends being respectively in contact with the engagement member and the collar member.

2. The machine tool according to claim 1, wherein the support-body-side guide portions and the moving-body-side guide portions are configured with sliding guide portions.

3. The machine tool according to claim 1, wherein a screw groove is formed in the outer peripheral surface of the tip portion of the engagement shaft, and the collar member is configured with an annular plate having an annulus in which the engagement shaft is inserted and having one end surface being in contact with the compressing spring, and a nut which is screwed with the screw groove and with which the other end surface of the annular plate is in contact.

4. The machine tool according to claim 3, wherein the support-body-side guide portions and the moving-body-side guide portions are configured with sliding guide portions.

5. A machine comprising:

a support body;

a moving body disposed on the support body to be movable in a horizontal direction;

guide means having two support-body-side guide portions being provided on the support body so that their guide directions are along the moving direction of the moving body and two moving-body-side guide portions being provided on the moving body and engaged with the support-body-side guide portions, and guiding the movement of the moving body with the engagement relationship between the guide portions, support-body-side guide portions being spaced in a direction perpendicular to the moving direction of the moving body, the moving-body-side guide portions being spaced in the direction perpendicular to the moving direction of the moving body;

feed means for moving the moving body; and the moving body having a center of gravity such that, when the center of gravity is projected on a moving plane of the moving body, the position of the projected center of gravity on the moving plane is position in a region outside a region between the moving-body-side guide portions in the direction perpendicular to the moving direction of the moving body, the machine tool further comprising:

a guide member provided on the support body so that its guide direction is parallel to the moving direction of the moving body;

a moving member engaged with the guide member and to be guided thereby, the moving member having a moving-member-side engagement portion engaged with a moving-body-side engagement portion which is provided on the moving body, and moving together with the moving body due to the engagement relationship between the moving-body-side engagement portion and the moving-member-side engagement portion; and energizing means provided on the moving member for energizing the moving body in such a direction that an offset load which acts on the guide means due to the relationship between the positions where the moving-body-side guide portions are arranged and the position of the center of gravity of the moving body is offset, wherein:

the moving body has an engagement member with an engagement hole as the moving-body-side engagement portion provided thereon, the engagement member being positioned in a region including the position of the projected center of gravity within the region outside the region between the moving-body-side guide portions;

the moving member is configured with a moving member body engaged with the guide member to be guided thereby and an engagement shaft, which is the moving-member-side engagement portion, provided on the moving member body in a standing position with the outer peripheral surface of its tip portion being in engagement with the engagement hole; and the energizing means is configured with a compressing spring in which the engagement shaft is inserted and energizes the engagement member with its ends being respectively in contact with the moving member body and the engagement member.

6. The machine tool according to claim 5, wherein the support-body-side guide portions and the moving-body-side guide portions are configured with sliding guide portions.

7. A machine tool comprising:

a support body;

a moving body disposed on the support body to be movable in a horizontal direction;

guide means having two support-body-side guide portions being provided on the support body so that their guide directions are along the moving direction of the moving body and two moving-body-side guide portions being provided on the moving body and engaged with the support-body-side guide portions, and guiding the movement of the moving body with the engagement relationship between the guide portions, the support-body-side guide portions being spaced in a direction perpendicular to the moving direction of the moving body, the moving-body-side guide portions being spaced in the direction perpendicular to the moving direction of the moving body;

feed means for moving the moving body; and the moving body having a center of gravity such that, when the center of gravity is projected on a moving plane of the moving body, the position of the projected center of gravity on the moving plane is positioned in a region outside a region between the moving-body-side guide portions in the direction perpendicular to the moving direction of the moving body, the machine tool further comprising:

a guide member provided on the support body so that its guide direction is parallel to the moving direction of the moving body;

a moving member engaged with the guide member and to be guided thereby, the moving member having a moving-member-side engagement portion engaged with a moving-body-side engagement portion which is provided on the moving body, and moving together with the moving body due to the engagement relationship between the moving-body-side engagement portion and the moving-member-side engagement portion; and energizing means provided on the moving member for energizing the moving body in such a direction that an offset load which acts on the guide means due to the relationship between the positions where the moving-body-side guide portions are arranged and the position of the center of gravity of the moving body is offset, wherein:

the moving body has an engagement member with an engagement hole as the moving-body-side engagement portion provided thereon, the engagement member being positioned in a region including the position of the projected center of gravity within the region outside the region between the moving-body-side guide portions;

the moving member is configured with a moving member body engaged with the guide member and to be guided thereby, an engagement shaft, which is the moving-member-side engagement portion, provided on the moving member body in a standing position, engaged with the engagement hole at the outer peripheral surface of the tip portion thereof, and having a screw groove formed in the outer peripheral surface thereof, an annular plate having an annulus in which the engagement shaft is inserted, and a nut which is screwed with the screw groove and which is provided closer to the root of the engagement shaft than the annular plate and with which one end surface of the annular plate is in contact; and the energizing means is configured with a compressing spring in which the engagement shaft is inserted and energizes the engagement member with its ends being respectively in contact with the other end surface of the annular plate and the engagement member.

8. The machine tool according to claim 7, wherein the support-body-side guide portions and the moving-body-side guide portions are configured with sliding guide portions.

* * * * *